United States Patent
Angel et al.

(10) Patent No.: US 10,204,159 B2
(45) Date of Patent: Feb. 12, 2019

(54) ON-DEMAND SYSTEM AND METHOD FOR RETRIEVING VIDEO FROM A COMMERCIAL VEHICLE

(71) Applicant: Trimble Navigation Limited, Sunnyvale, CA (US)

(72) Inventors: James W. Angel, Mansfield, TX (US); David Dew, Wellesley, MA (US); Michael D. Nalepka, Franklin, TN (US)

(73) Assignee: Trimble Navigation Limited, Sunnyvale, CA (US)

( * ) Notice: Subject to any disclaimer, the term of this patent is extended or adjusted under 35 U.S.C. 154(b) by 193 days.

(21) Appl. No.: 14/832,858

(22) Filed: Aug. 21, 2015

(65) Prior Publication Data
US 2017/0054948 A1    Feb. 23, 2017

(51) Int. Cl.
| | |
|---|---|
| *G06F 17/30* | (2006.01) |
| *H04N 5/77* | (2006.01) |
| *G06K 9/00* | (2006.01) |
| *H04N 5/907* | (2006.01) |
| *G07C 5/00* | (2006.01) |
| *G07C 5/08* | (2006.01) |

(52) U.S. Cl.
CPC ..... *G06F 17/3082* (2013.01); *G06K 9/00718* (2013.01); *G06K 9/00791* (2013.01); *G06K 9/00973* (2013.01); *G07C 5/008* (2013.01); *G07C 5/0808* (2013.01); *G07C 5/0866* (2013.01); *H04N 5/77* (2013.01); *H04N 5/772* (2013.01); *H04N 5/907* (2013.01); *G06K 2009/00738* (2013.01)

(58) Field of Classification Search
None
See application file for complete search history.

(56) References Cited

U.S. PATENT DOCUMENTS

| | | |
|---|---|---|
| 2,978,971 A | 4/1961 | Eburn, Jr. |
| 3,528,524 A | 9/1970 | Birbanescu et al. |
| 3,689,695 A | 9/1972 | Rosenfield et al. |
| 4,023,507 A | 5/1977 | Van der Lely |

(Continued)

OTHER PUBLICATIONS

Axiomatic Global Electronic Solutions, "What is SAE J1939," www.axiomatic.com, Jul. 2006, 3 pages.

(Continued)

*Primary Examiner* — James M Anderson, II
(74) *Attorney, Agent, or Firm* — Hollingsworth Davis, LLC

(57) ABSTRACT

An apparatus for use with a commercial vehicle comprises a media recorder configured to receive video from one or more cameras. The media recorder comprises a memory configured to store a loop of the video as a circular buffer having a predetermined duration. A transceiver is communicatively coupled to the media recorder and configured to receive a video request command generated at a central office. An event detector is configured to communicate with a vehicle computer and detect predetermined events occurring during vehicle operation. The media recorder is configured to retrieve a portion of the loop of video stored in the memory and the transceiver is configured to transmit the portion of the loop of video to the central office in response to the video request command.

21 Claims, 9 Drawing Sheets

(56) References Cited

U.S. PATENT DOCUMENTS

| | | |
|---|---|---|
| 4,110,792 A | 8/1978 | Long et al. |
| RE30,539 E | 3/1981 | Van der Lely |
| 4,277,804 A | 7/1981 | Robison |
| 4,365,268 A | 12/1982 | Allen et al. |
| 4,555,725 A | 11/1985 | Geiersbach et al. |
| 4,776,750 A | 10/1988 | Griswold, Jr. et al. |
| 4,892,345 A | 1/1990 | Rachael |
| 5,015,189 A | 5/1991 | Wenzinger, Jr. |
| 5,090,804 A | 2/1992 | Wong et al. |
| 5,191,370 A | 3/1993 | Bozzolato |
| 5,289,321 A | 2/1994 | Secor |
| 5,429,329 A | 7/1995 | Wallace et al. |
| 5,517,419 A | 5/1996 | Lanckton et al. |
| 5,530,421 A | 6/1996 | Marshall et al. |
| 5,637,871 A | 6/1997 | Piety et al. |
| 5,956,079 A | 9/1999 | Ridgley |
| 5,995,900 A | 11/1999 | Hsiao et al. |
| 6,133,851 A | 10/2000 | Johnson |
| 6,148,255 A | 11/2000 | Van der Lely |
| 6,259,475 B1 | 7/2001 | Ramachandran et al. |
| 6,288,362 B1 | 9/2001 | Thomas et al. |
| 6,426,704 B1 | 7/2002 | Hutchison |
| 6,433,683 B1 | 8/2002 | Robinson |
| 6,434,450 B1 | 8/2002 | Griffin, Jr. et al. |
| 6,491,417 B1 | 12/2002 | Haen et al. |
| 6,578,675 B2 | 6/2003 | Wilson et al. |
| 6,690,413 B1 | 2/2004 | Moore |
| 6,693,519 B2 | 2/2004 | Keirstead |
| 6,750,898 B1 | 6/2004 | Ishida et al. |
| 6,783,187 B2 | 8/2004 | Parsons |
| 6,927,694 B1 | 8/2005 | Smith et al. |
| 6,933,837 B2 | 8/2005 | Gunderson et al. |
| 6,970,772 B2 | 11/2005 | Radtke et al. |
| 7,006,129 B1 | 2/2006 | McClure |
| 7,102,665 B1 | 9/2006 | Chandler et al. |
| 7,142,098 B2 | 11/2006 | Lang et al. |
| 7,164,476 B2 | 1/2007 | Shima et al. |
| 7,171,769 B2 | 2/2007 | Schultz et al. |
| 7,176,958 B2 | 2/2007 | Jones |
| 7,184,074 B1 | 2/2007 | Jansen |
| 7,193,508 B2 | 3/2007 | Hill et al. |
| 7,195,267 B1 | 3/2007 | Thompson |
| 7,204,504 B2 | 4/2007 | Gehring et al. |
| 7,265,663 B2 | 9/2007 | Steele |
| 7,280,042 B2 | 10/2007 | Trela |
| 7,306,398 B2 | 12/2007 | Doran, Jr. |
| 7,342,486 B2 | 3/2008 | Tsukada et al. |
| 7,344,109 B1 | 3/2008 | Rezai |
| 7,358,851 B2 | 4/2008 | Patenaude et al. |
| 7,400,957 B2 | 7/2008 | Hofer et al. |
| 7,434,643 B2 | 10/2008 | Lesesky et al. |
| 7,536,457 B2 | 5/2009 | Miller |
| 7,565,941 B2 | 7/2009 | Cunningham |
| 7,659,827 B2 | 2/2010 | Gunderson et al. |
| 7,660,433 B2 | 2/2010 | Dralle et al. |
| 7,725,216 B2 | 5/2010 | Kim |
| 7,804,426 B2 | 9/2010 | Etcheson |
| 7,825,951 B2 | 11/2010 | Lang et al. |
| 7,880,609 B2 | 2/2011 | Viegers et al. |
| 7,922,085 B2 | 4/2011 | Thomas et al. |
| 7,974,444 B2 | 7/2011 | Hongo |
| 8,000,843 B2 | 8/2011 | Kim |
| 8,004,112 B2 | 8/2011 | Koga et al. |
| 8,009,034 B2 | 8/2011 | Dobson et al. |
| 8,046,414 B2 | 10/2011 | Kamdar et al. |
| 8,120,653 B2 | 2/2012 | Schmidt et al. |
| 8,126,309 B2 | 2/2012 | Sakai |
| 8,139,820 B2 | 3/2012 | Plante et al. |
| 8,181,868 B2 | 5/2012 | Thomas et al. |
| 8,198,991 B2 | 6/2012 | Do |
| 8,199,975 B2 | 6/2012 | Pomerleau et al. |
| 8,232,871 B2 | 7/2012 | Lesesky |
| 8,239,092 B2 | 8/2012 | Plante et al. |
| 8,262,120 B1 | 9/2012 | Pitts et al. |
| 8,269,617 B2 | 9/2012 | Cook et al. |
| 8,276,322 B2 | 10/2012 | Miller |
| 8,314,708 B2 | 11/2012 | Gunderson et al. |
| 8,330,817 B1 | 12/2012 | Foster |
| 8,342,597 B2 | 1/2013 | Nagami et al. |
| 8,373,567 B2 | 2/2013 | Denson |
| 8,374,746 B2 | 2/2013 | Plante |
| 8,427,288 B2 | 4/2013 | Schofield et al. |
| 8,500,383 B2 | 8/2013 | Schmidgall |
| 8,508,353 B2 | 8/2013 | Cook et al. |
| 8,564,446 B2 | 10/2013 | Gunderson et al. |
| 8,564,658 B2 | 10/2013 | Nimberger |
| 8,583,314 B2 | 11/2013 | de Oliveira et al. |
| 8,606,492 B1 | 12/2013 | Botnen |
| 8,626,568 B2 | 1/2014 | Warkentin et al. |
| 8,649,933 B2 | 2/2014 | Plante et al. |
| 8,670,035 B2 | 3/2014 | Robert |
| 8,676,491 B2 | 3/2014 | Taylor et al. |
| 8,680,976 B2 | 3/2014 | Lesesky |
| 8,725,345 B2 | 5/2014 | De Oliveira et al. |
| 8,744,642 B2 | 6/2014 | Nemat-Nasser et al. |
| 8,757,084 B2 | 6/2014 | Condit et al. |
| 8,849,501 B2 | 9/2014 | Cook et al. |
| 8,854,199 B2 | 10/2014 | Cook et al. |
| 8,880,279 B2 | 11/2014 | Plante |
| 8,892,310 B1 | 11/2014 | Palmer et al. |
| 8,930,072 B1 | 1/2015 | Lambert et al. |
| 8,952,819 B2 | 2/2015 | Nemat-Nasser |
| 9,286,938 B1 * | 3/2016 | Tseytlin ................ G11B 27/02 |
| 2002/0066621 A1 | 6/2002 | Wilson et al. |
| 2002/0080016 A1 | 6/2002 | Keirstead |
| 2002/0191407 A1 | 12/2002 | Haen et al. |
| 2003/0028298 A1 | 2/2003 | Macky et al. |
| 2003/0141965 A1 | 7/2003 | Gunderson et al. |
| 2003/0234512 A1 | 12/2003 | Holub |
| 2004/0021858 A1 | 2/2004 | Shima et al. |
| 2004/0041942 A1 | 3/2004 | Jones |
| 2004/0080206 A1 | 4/2004 | Parsons |
| 2004/0088090 A1 | 5/2004 | Wee |
| 2004/0196366 A1 | 10/2004 | Thiel |
| 2004/0212489 A1 | 10/2004 | Chan |
| 2005/0015805 A1 | 1/2005 | Iwamura |
| 2005/0102079 A1 | 5/2005 | Hofer et al. |
| 2005/0146607 A1 | 7/2005 | Linn et al. |
| 2005/0151845 A1 | 7/2005 | Tsukada et al. |
| 2005/0162513 A1 | 7/2005 | Chan |
| 2005/0193603 A1 | 9/2005 | Schultz et al. |
| 2005/0216294 A1 | 9/2005 | Labow |
| 2005/0219359 A1 | 10/2005 | Trela |
| 2005/0230163 A1 | 10/2005 | Cunningham |
| 2005/0242931 A1 | 11/2005 | Gunderson et al. |
| 2006/0061656 A1 | 3/2006 | Lang et al. |
| 2006/0092403 A1 | 5/2006 | Dralle et al. |
| 2006/0098094 A1 | 5/2006 | Lott |
| 2006/0139454 A1 * | 6/2006 | Trapani ................ B60R 25/102 348/148 |
| 2006/0147264 A1 | 7/2006 | Doran |
| 2006/0251502 A1 | 11/2006 | Scharfenberger |
| 2007/0035632 A1 * | 2/2007 | Silvernail ............ G07C 5/085 348/211.3 |
| 2007/0120953 A1 | 5/2007 | Koga et al. |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0139182 A1 | 6/2007 | O'Connor et al. |
| 2007/0150373 A1 | 6/2007 | Kuo |
| 2007/0174624 A1 | 7/2007 | Wolosewicz et al. |
| 2007/0268158 A1 | 11/2007 | Gunderson et al. |
| 2007/0271105 A1 | 11/2007 | Gunderson et al. |
| 2008/0043736 A1 | 2/2008 | Stanley |
| 2008/0044061 A1 | 2/2008 | Hongo |
| 2008/0049830 A1 | 2/2008 | Richardson |
| 2008/0111666 A1 | 5/2008 | Plante et al. |
| 2008/0122603 A1 | 5/2008 | Plante et al. |
| 2008/0147267 A1 | 6/2008 | Plante et al. |
| 2008/0158352 A1 | 7/2008 | Schmidt et al. |
| 2008/0252417 A1 | 10/2008 | Thomas et al. |
| 2008/0304705 A1 | 12/2008 | Pomerleau et al. |
| 2008/0319602 A1 | 12/2008 | McClellan et al. |

(56) References Cited

U.S. PATENT DOCUMENTS

| | | |
|---|---|---|
| 2009/0057069 A1 | 3/2009 | Boggess |
| 2009/0102923 A1 | 4/2009 | Mason |
| 2009/0192638 A1 | 7/2009 | Leest et al. |
| 2009/0299805 A1 | 12/2009 | Baughman et al. |
| 2009/0309468 A1 | 12/2009 | Miller |
| 2009/0319341 A1 | 12/2009 | Berkobin et al. |
| 2010/0049994 A1 | 2/2010 | Ghoshal |
| 2010/0073473 A1 | 3/2010 | Nimberger |
| 2010/0085171 A1 | 4/2010 | Do |
| 2010/0157061 A1 | 6/2010 | Katsman et al. |
| 2010/0171828 A1 | 7/2010 | Ishii |
| 2010/0194976 A1 | 8/2010 | Smith et al. |
| 2010/0207744 A1 | 8/2010 | Lammers et al. |
| 2010/0225738 A1 | 9/2010 | Webster |
| 2011/0035777 A1 | 2/2011 | Chae et al. |
| 2011/0096166 A1 | 4/2011 | Englander et al. |
| 2011/0149077 A1 | 6/2011 | Robert |
| 2011/0163159 A1 | 7/2011 | Thomas et al. |
| 2011/0295446 A1 | 12/2011 | Basir et al. |
| 2012/0030041 A1 | 2/2012 | Wolosewicz et al. |
| 2012/0034056 A1 | 2/2012 | Schmidgall |
| 2012/0062741 A1 | 3/2012 | Stimel et al. |
| 2012/0063736 A1* | 3/2012 | Simmons ............... H04N 5/772 386/224 |
| 2012/0092510 A1* | 4/2012 | Masters ................ H04N 5/247 348/207.1 |
| 2012/0146361 A1 | 6/2012 | Nagami et al. |
| 2012/0181878 A1 | 7/2012 | Nosaka et al. |
| 2012/0201312 A1 | 8/2012 | Schwager |
| 2012/0277950 A1 | 11/2012 | Plante et al. |
| 2012/0318187 A1 | 12/2012 | Condit et al. |
| 2012/0330597 A1 | 12/2012 | Lammers |
| 2013/0021148 A1 | 1/2013 | Cook et al. |
| 2013/0024060 A1 | 1/2013 | Sukkarie et al. |
| 2013/0069390 A1 | 3/2013 | Foster |
| 2013/0096731 A1 | 4/2013 | Tamari et al. |
| 2013/0107044 A1 | 5/2013 | Azevedo |
| 2013/0169425 A1 | 7/2013 | Victor et al. |
| 2013/0188050 A1 | 7/2013 | Winget |
| 2013/0197774 A1 | 8/2013 | Denson |
| 2013/0233448 A1 | 9/2013 | Schrubbe et al. |
| 2013/0274950 A1 | 10/2013 | Richardson et al. |
| 2013/0286204 A1* | 10/2013 | Cheng ..................... H04N 5/33 348/148 |
| 2013/0317711 A1 | 11/2013 | Plante |
| 2013/0332004 A1* | 12/2013 | Gompert ................ G07C 5/008 701/1 |
| 2013/0345927 A1 | 12/2013 | Cook et al. |
| 2014/0015977 A1* | 1/2014 | Taylor ................ B60C 23/0408 348/148 |
| 2014/0025254 A1 | 1/2014 | Plante et al. |
| 2014/0046550 A1 | 2/2014 | Palmer et al. |
| 2014/0046569 A1 | 2/2014 | Mohn et al. |
| 2014/0047371 A1 | 2/2014 | Palmer et al. |
| 2014/0058616 A1 | 2/2014 | de Oliveira |
| 2014/0088824 A1 | 3/2014 | Ishimoto |
| 2014/0094992 A1 | 4/2014 | Lambert et al. |
| 2014/0139655 A1 | 5/2014 | Mimar |
| 2014/0152828 A1 | 6/2014 | Plante et al. |
| 2014/0167945 A1 | 6/2014 | Cook et al. |
| 2014/0195105 A1 | 7/2014 | Lambert |
| 2016/0037140 A1* | 2/2016 | Lindsey .................. H04N 5/77 348/143 |

OTHER PUBLICATIONS

Britell et al., "Collision Avoidance Through Improved Communication Between Tractor and Trailer," Federal Register, vol. 59, No. 170, Sep. 2, 1994, pp. 45750-45752.

Corrigan, "Introduction to the Controller Area Network (CAN)," Application Report SLOA101A, Texas Instruments, Aug. 2002, 15 pages.

Fleet Camera Systems Fleet Safety, "In Vehicle Camera," www.safetytrackcam.com, printed on Jul. 16, 2014, 2 pages.

Junger, "Introduction to J1939," Vector Informatik GmbH, Application Note AN-ION-1-3100, www.vector.com, Apr. 27, 2010, 11 pages.

Lin et al., "Evaluation of the Power Line Motor Carrier Rearview Video System," State of Florida Department of Transportation, Jun. 2009, 147 pages.

Maryanka, "Using Power Line Communication for Harness Reduction in Automotive," Yamar Electronics Ltd, www.yamar.com, 2011, 4 pages.

SAE International, "The SAE J1939 Communications Network: An overview of the J1939 family of standards and how they are used," www.sae.org, 7 pages.

SAE International, "Surface Vehicle Recommended Practice," www.sae.org, 2004, 16 pages.

Safety Track's UCIT, Live Streaming Camera, SafetyTrackCam.com.

* cited by examiner

US 10,204,159 B2

ON-DEMAND SYSTEM AND METHOD FOR RETRIEVING VIDEO FROM A COMMERCIAL VEHICLE

TECHNICAL FIELD

This application relates generally to systems and methods pertaining to capturing video at a vehicle, and retrieving specified video content from a particular vehicle for transmission to a remote system.

SUMMARY

Embodiments are directed to a method comprising capturing video from one or more cameras provided at each of a plurality of commercial vehicles, and recording, at each of the plurality of vehicles, a loop of the video as a circular buffer having a predetermined duration. The method also comprises receiving, at a particular vehicle, a video request command generated at a remote location, and transmitting, from the particular vehicle, a portion of the loop of video to the remote location in response to the video request command.

Other embodiments are directed to an apparatus for use with a commercial vehicle comprising one or more cameras and a media recorder configured to receive video from the one or more cameras. The media recorder comprises a memory configured to store a loop of the video as a circular buffer having a predetermined duration. A transceiver is communicatively coupled to the media recorder, and is configured to receive a video request command generated at a central office. The media recorder is configured to retrieve a portion of the loop of video stored in the memory and the transceiver is configured to transmit the portion of the loop of video to the central office in response to the video request command. The one or more cameras, the media recorder, and the transceiver are configured to be mounted at the vehicle.

Some embodiments are directed to an apparatus for use with a commercial vehicle comprising one or more cameras and a media recorder configured to receive video from the one or more cameras. The media recorder comprises a memory configured to store a loop of the video as a circular buffer having a predetermined duration. A transceiver is communicatively coupled to the media recorder, and is configured to receive a video request command generated at a central office. An event detector is configured to communicate with a vehicle computer and to detect predetermined events occurring during vehicle operation. The media recorder is configured to retrieve a portion of the loop of video stored in the memory and the transceiver is configured to transmit the portion of the loop of video to the central office in response to the video request command. The one or more cameras, the media recorder, the transceiver, and the event detector are configured to be mounted at the vehicle.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments of the disclosure are directed to systems and methods for implementing on-demand retrieval of video from a selected commercial vehicle in response to a request initiated at a remote location, such as a central office. Commercial vehicles of a fleet can be equipped with an onboard video recording capability, typically as part of an event detection system installed in each of the vehicles. Various embodiments disclosed herein integrate video capture with event detection in order to generate video clips in response to detection of predetermined events that occurred during vehicle operation. For example, a driver may cause rapid deceleration of the vehicle in an unsafe manner which is detected as a "sudden deceleration" event. In response to the detected event, a video clip is created using video data acquired by one or more cameras mounted at the vehicle. The video clip and related event data acquired from the vehicle computer and other sensors is transmitted to a central office for further processing.

The availability of video data when analyzing a vehicle event can provide for enhanced insight into driver behavior, allowing for more accurate driver evaluation and effective corrective action.

There are, however, incidences involving a commercial vehicle that do not result in detection of an event. For such incidences, event-based video is not captured. For example, a commercial vehicle may be backing up at a terminal while a forklift is operating at the rear of the vehicle's trailer. The close proximity of the two vehicles causes the forklift to veer into a stack of loaded crates, causing damage to product. In this illustrative scenario, the onboard system did not detect a triggering event and, therefore, a vehicle event was not detected. As such, a video clip for this scenario was not created. However, video of this scenario could reveal which party was responsible for the accident. For example, the availability of video in this scenario could exonerate the driver of the commercial vehicle, thereby reducing the liability of the fleet owner.

Embodiments of the disclosure are directed to capturing video on a continuous basis at a commercial vehicle, such that video is recorded at the vehicle during periods between detected vehicle events. Continuous video capture at the vehicle is managed by a media recorder to allow for subsequent retrieval of selected video content by a remote system, but for a limited period of time. For example, video is recorded at a vehicle on a continuous basis but stored only for a maximum duration of time, after which the recorded video is discarded. Embodiments of the disclosure allow a remote user to retrieve video content of interest from specific vehicles for analysis and review. On-demand retrieval of video from specified commercial vehicles allows for remote analysis of video data during times in which video clips are unavailable due to the absence of detected vehicle events.

Figure 1:
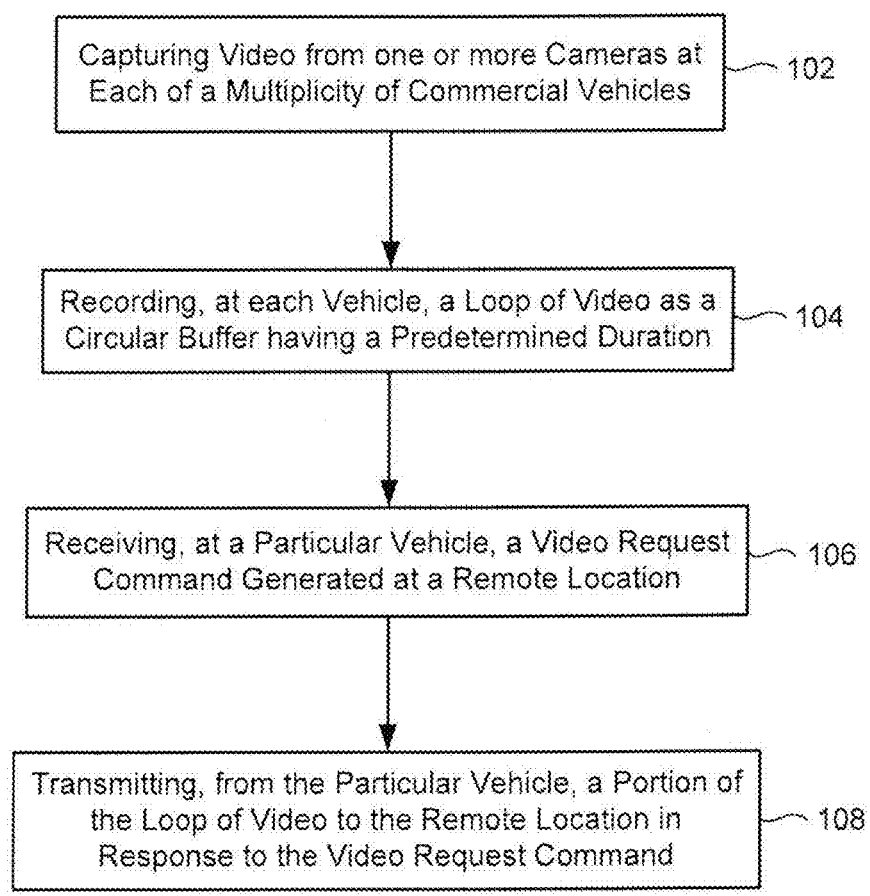
FIG. 1 is a flow chart illustrating various processes for implementing on-demand retrieval of video from a particular commercial vehicle in accordance with various embodiments.

FIG. 1 illustrates a method for implementing on-demand retrieval of video from a specified commercial vehicle in accordance with various embodiments. The method shown in FIG. 1 involves capturing 102 video from one or more cameras situated at each of a multiplicity of commercial vehicles. The method also involves recording 104, at each vehicle, a loop of video as a circular buffer having a predetermined duration. The method further involves receiving 106, at a particular vehicle, a video request command generated at a remote location. The method also involves transmitting 108, from the particular vehicle, a portion of the loop of video to the remote location in response to the video request command.

Figure 2:
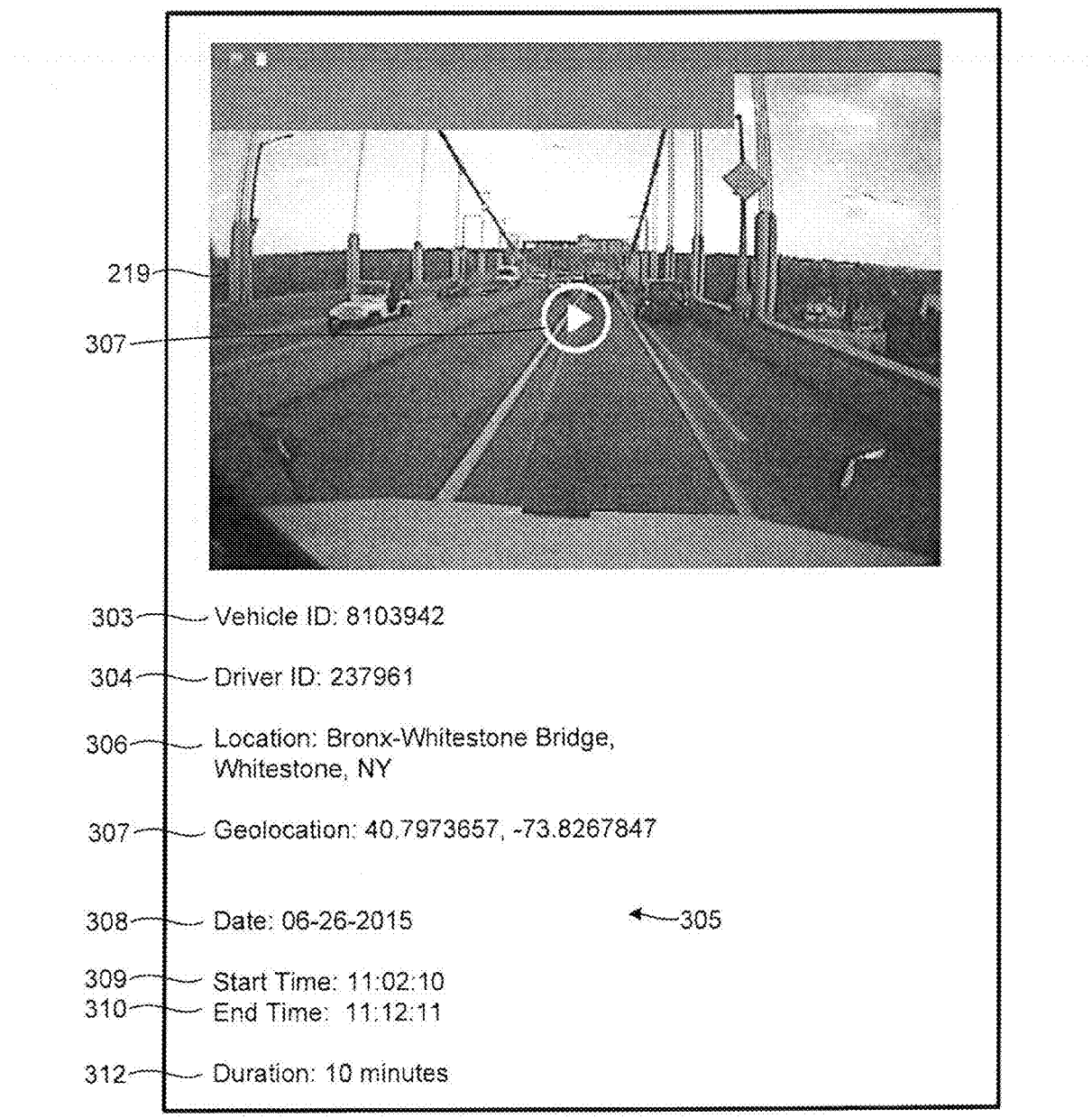
FIG. 2 is a representative portion of a video loop retrieved from a specified commercial vehicle in accordance with various embodiments.

FIG. 2 illustrates a portion of a loop of video retrieved from a specified vehicle in accordance with various embodiments. The video loop portion (VLP) 219 shown in FIG. 2 can be considered a video clip, but the term video loop portion is used herein to distinguish between video clips generated in response to detected vehicle events and video content (VLP) obtained in response to an on-demand retrieval request. The representative VLP 219 shown in FIG. 2 includes declaration data 305, which includes information associated with the VLP 219.

The declaration data 305 includes the vehicle ID 303, which is an identifying code that uniquely identifies the vehicle, and the Driver ID 304, which is an identifying code that uniquely identifies the driver. The location 306 and geolocation 307 can also be included in the declaration data 305. Also included in the declaration data 305 is the date 308 on which the video was captured by the media recorder at the vehicle. It is noted that the date 308 shown in the declaration data 305 is the date of video capture, which is typically different from the date the request for the video was made by the remote user. The declaration data 305 also includes a start time 309 and an end time 310, as well as a duration 312 (e.g., 10 minutes). The start time 309 corresponds to the time of day when capture of the VLP 219 was initiated. The end time 310 corresponds to the time of day when capture of the VLP 219 was terminated. At the central office or other location, the VLP 219 can be played by actuating the play button 307. The VLP 219 can also include contemporaneously recorded audio.

Figure 3:
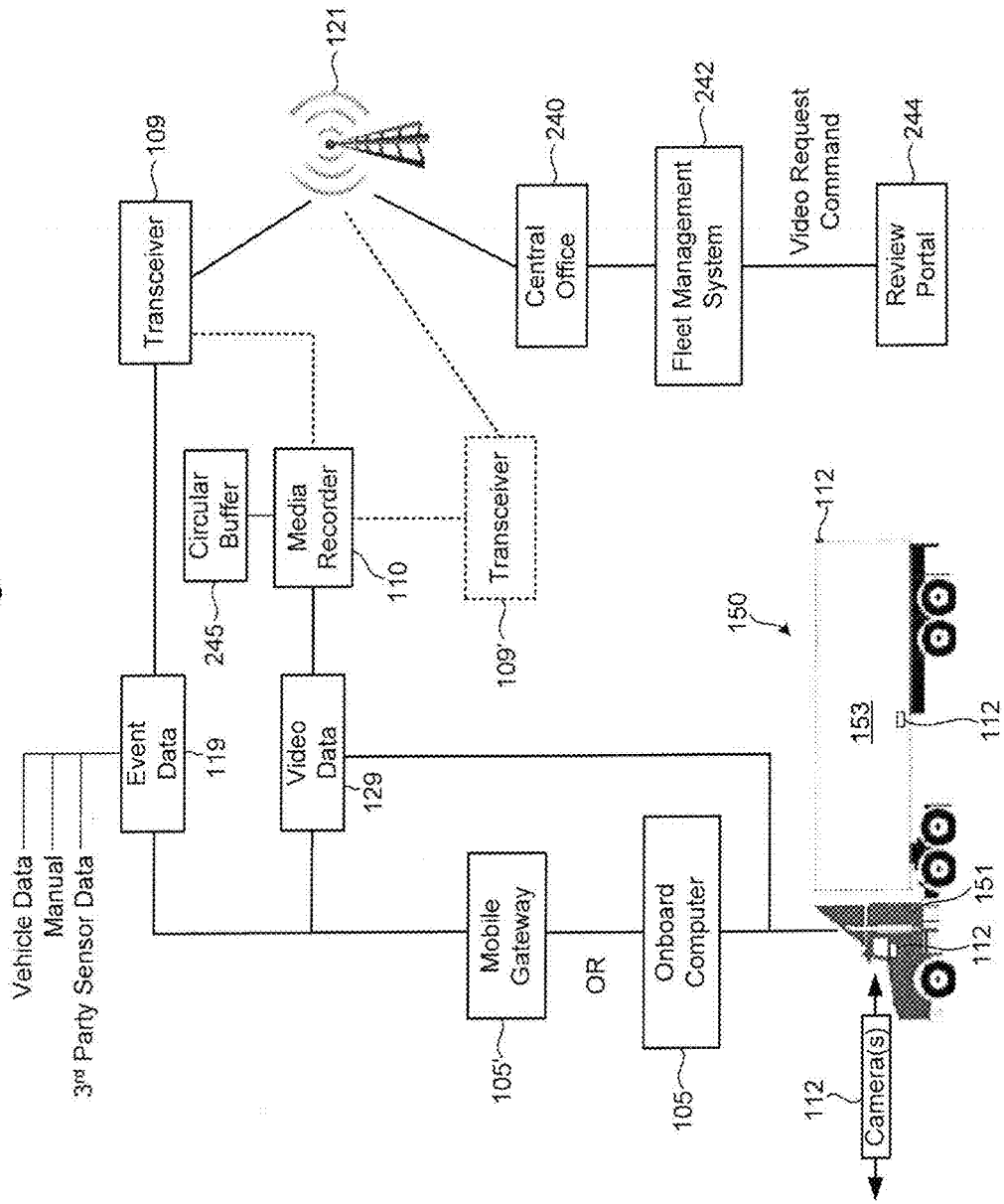
FIG. 3 illustrates a system for implementing on-demand retrieval of video from specified commercial vehicles in accordance with various embodiments.

FIG. 3 illustrates a system for implementing on-demand retrieval of video from a specified commercial vehicle in accordance with various embodiments of the present disclosure. The system shown in FIG. 3 illustrates different systems that can operate cooperatively or separately. For example, portions of the system shown in FIG. 3 are configured to implement on-demand video retrieval, while other portions are configured to implement event-based video capture, transmission, and analysis. Many of the components shown in FIG. 3 are configured to implement both on-demand video retrieval and event-based video capture, transmission, and analysis. It is understood that embodiments of the present disclosure are directed to systems that implement on-demand video retrieval, while other embodiments are directed to systems that implement both on-demand video retrieval and event-based video capture, transmission, and analysis.

According to the embodiment shown in FIG. 3, a commercial vehicle 150 includes a tractor 151 and a trailer 153. The vehicle 150 is shown to include a number of cameras mounted on the vehicle at different locations. For example, the tractor 151 includes a forward-looking camera 112. In some embodiments, the tractor 151 includes a driver-looking camera 112 in addition to a forward-looking camera 112. Various embodiments can include cameras 112 situated within the interior or on the exterior of the trailer 153 (e.g., one or more rearward or back-up cameras 112), on the exterior of the tractor 151, and/or within the cab of the tractor 151. All locations on the interior and exterior surfaces of the trailer 153 and tractor 151 are contemplated.

A media recorder 110 is situated at the vehicle 150, typically within the cab of the tractor 151. The media recorder 110 is configured to store event-based video clips resulting from onboard detection of vehicle events. The media recorder 110 also includes a circular buffer memory 245 configured to store one or more channels of continuous video captured by one or more cameras mounted at the vehicle. The video data recorded in the circular buffer memory 245 is managed in accordance with a first-in-first-out (FIFO) queuing methodology according to various embodiments. For example, one or more loops of video corresponding to one or more video channels (e.g., one or more cameras) are defined to have a predetermined duration (e.g., one or two weeks), after which the earliest video data is overwritten by newly received video data for each loop managed within the circular buffer memory 245. Other memory management methodologies can be employed as an alternative to a FIFO queuing methodology for managing continuously captured video at the vehicle 150.

Mounted at the tractor 151, typically within the cab, is either an onboard computer 105 or a mobile gateway 105', both of which are described in greater detail hereinbelow. In general, the onboard computer 105 and the mobile gateway 105' are configured to capture video (and, in some embodiments, still photographs) in accordance with an on-demand video retrieval methodology. According to various embodiments, the onboard computer 105 and the mobile gateway 105' are also configured to monitor for occurrence of a variety of predetermined events (e.g., safety-related events) by monitoring vehicle computer data, camera data (which may include audio data), and other sensor data. For example, an "improper passing" event or an "improper turn" event can be detected using video produced by the forward-looking camera 112. A "roll instability" event can be detected using an accelerometer or other type of rate sensor, for example. Sudden acceleration, sudden deceleration, and speeding can be detected using vehicle computer data. A variety of predetermined events that trigger event data and/or video capture are contemplated, additional examples of which are described hereinbelow.

In response to detecting a predetermined event, which may be a manual event initiated by the driver of the vehicle 150, event data 119 is captured by the onboard computer 105 or the mobile gateway 105'. Video data 129 produced by the cameras 112 is also captured and recorded by the media recorder 110 for a detected event, referred to herein as event-based video in which a video clip is created. It is to be understood that the event-based video or video clip is distinct from a video loop portion selected from a loop of continuously captured video at the vehicle 150 in accordance with an on-demand video retrieval methodology. It is noted that for minor events, event-based video data may not be recorded. It is understood that video data requires significant resources for storage and transmission relative to alphanumeric data (e.g., event data). As such, video data for minor events can be, but need not be, captured for storage and subsequent transmission and analysis.

In some embodiments, video data 129 (e.g., a video clip or a VLP) is transmitted to the media recorder 110 along one or more connections (e.g., HDMI) that bypass the onboard computer 105 or mobile gateway 105', with the media recorder 110 being communicatively coupled to the onboard computer 105 or mobile gateway 105' for control purposes. In other embodiments, the media recorder 110 is a component of the onboard computer 105 or mobile gateway 105'. In some embodiments, the event data 119 and the video data 129 are communicated to the central office via a transceiver 109, such as a cellular transmitter/receiver of the onboard system. In other embodiments, and as described in detail with reference to FIG. 4, the event data can be communicated to the central office 240 via a first transceiver 109 of the onboard system, and the video data 129 can be transmitted to the central office 240 via a second transceiver 109' of the onboard system.

A fleet management system 242 at the central office 240 processes and manages the event data 119 and the video data 129. For example, the fleet management system 242 can receive a video request command from a user, such as fleet safety manager, via a review portal 244 or other system connection. The fleet management system 242 can transmit the video request command to a transceiver 109 of a specified vehicle via the central office 240 and communication infrastructure 121. In response to the video request command, the media recorder 110 of the specified vehicle retrieves video from its circular buffer memory 245 that corresponds to video captured on a particular date, at a particular time, and for a particular duration as specified in the video request command. A portion of a video loop (e.g., a VLP) that is specified by the video request command is transferred from the circular buffer memory 245 to a transceiver 109 or 109' of the vehicle 150. The VLP is then transmitted to the central office 240 for further processing by the fleet management system 242. The user may review the retrieved VLP via the review portal 244 or other user interface.

Figure 4:
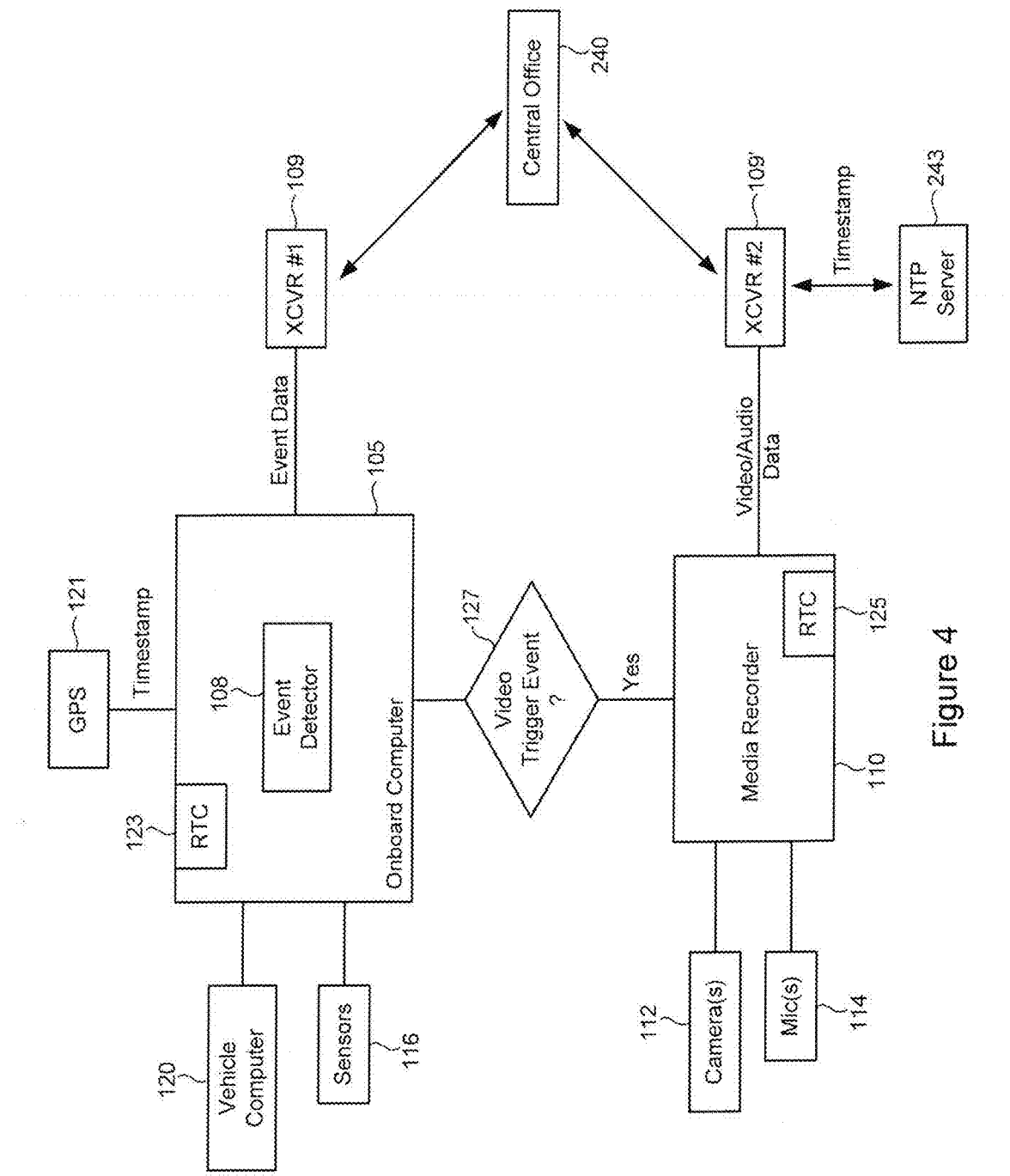
FIG. 4 is a block diagram of a system for communicating event data and video data from a commercial vehicle using separate transceivers in accordance with various embodiments.

Turning now to FIG. 4, there is illustrated a block diagram of a system for communicating video data and event data for a commercial vehicle using separate transceivers in accordance with various embodiments. In the embodiment shown in FIG. 4, an onboard computer 105 (or optionally a mobile gateway) is configured to communicate event data to a central office 240 via a first transceiver 109. A media recorder 110 is configured to communicate video (e.g., a video clip or a VLP) and optionally audio to the central office 240 via a second transceiver 109'. For example, the onboard computer 105 can include its own cellular radio 109 with its own SIM card and service plan. Likewise, the media recorder 110 can include its own cellular radio 109' with its own SIM card and service plan. Use of a separate cellular link by the media recorder 110 allows for tailoring the link and service plan specifically for image/video communication between the vehicle and the central office 240.

In the embodiment shown in FIG. 4, the onboard computer 105 is coupled to a vehicle computer 120 and one or more sensors 116. The onboard computer 105 includes an event detector 108 and a real-time clock (RTC) 123. The media recorder 110 is shown coupled to one or more cameras 112 and optionally to one or more microphones 114. The media recorder 110 includes an RTC 125. The RTC 123 of the onboard computer 105 is updated on a regular basis using timestamp data produced by a GPS sensor 121. For example, the RTC 123 can be updated every 5, 10 or 15 minutes (e.g., a configurable time interval) using the GPS sensor timestamp. The media recorder 110 updates its RTC 125 by synchronizing to timestamp data received from a Network Time Protocol (NTP) server 243. The NTP server 243 is accessed by the media recorder 110 via transceiver 109'. The media recorder 110 can update its RTC 125 using the NTP server timestamp periodically, such as every 5, 10, or 15 minutes (e.g., a configurable time interval), for example. The frequency of RTC updating by the onboard computer 105 and the media recorder 110 can be selected to achieve a desired degree of time base accuracy. It is noted that the onboard computer 105 can also update its RTC 123 using timestamp data received from an NTP server 243 rather than from the GPS sensor 121 (e.g., at times when the GPS sensor is out of satellite range).

An important consideration when communicating event and video data via separate transceivers is time synchronization. Because event data is communicated through a cellular link separate from that used to communicate the video data, proper time synchronization is required so that event and video data associated with a specific vehicle event can be properly associated at the central office 240. Because the RTCs 123 and 125 are frequently updated using highly accurate time bases (e.g., NTS server, GPS sensor), the timestamps included with the event data and the video data for a given event can be synchronized at the central office 240 with high accuracy. The central office 240 can rely on the accuracy of the event data and video data timestamps when associating the disparate data acquired from the two transceivers 109 and 109'.

Figure 5:
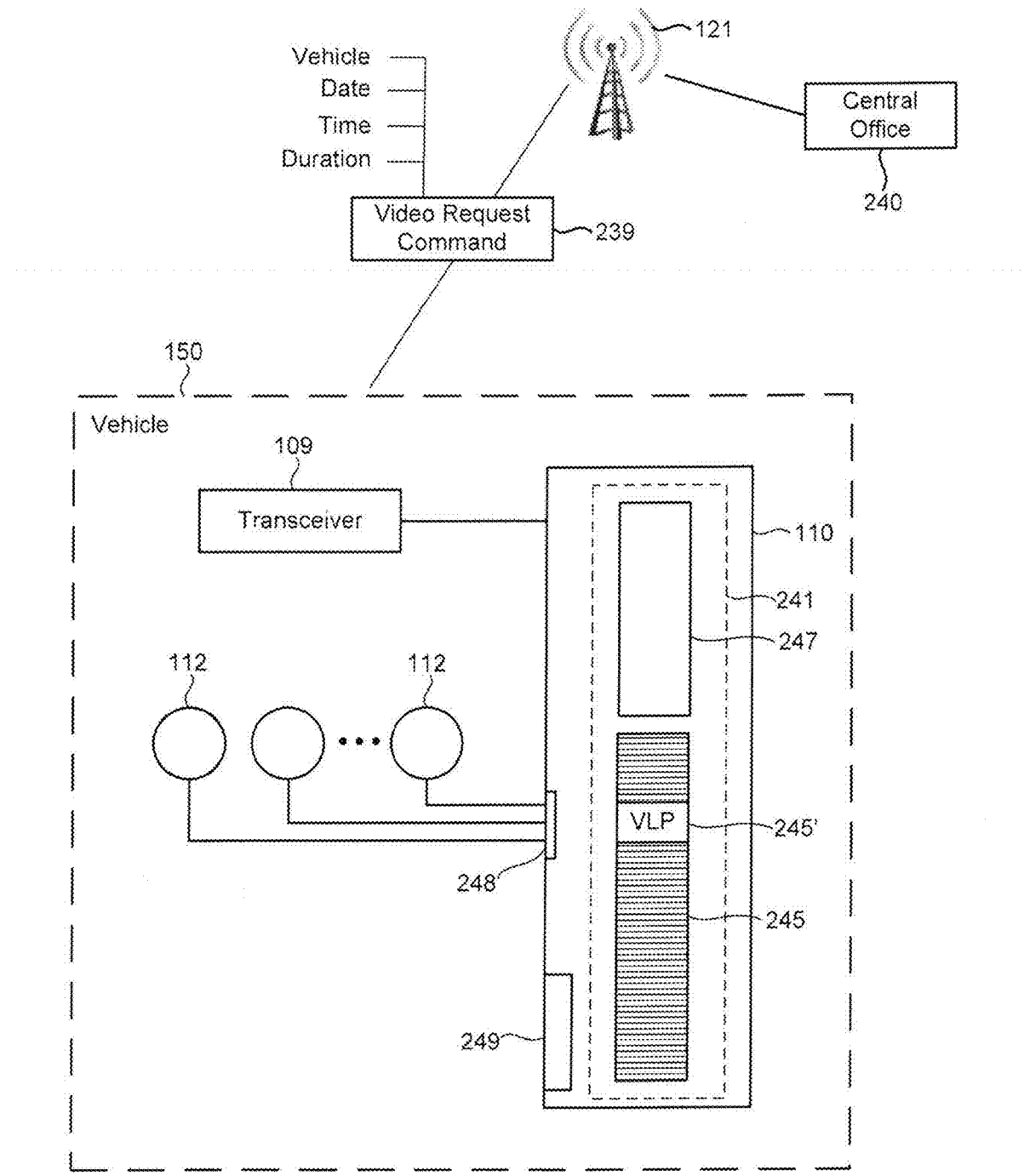
FIG. 5 shows details of a media recorder configured for use on a commercial vehicle with which on-demand retrieval of video from the vehicle can be implemented in accordance with various embodiments.
Figure 6:
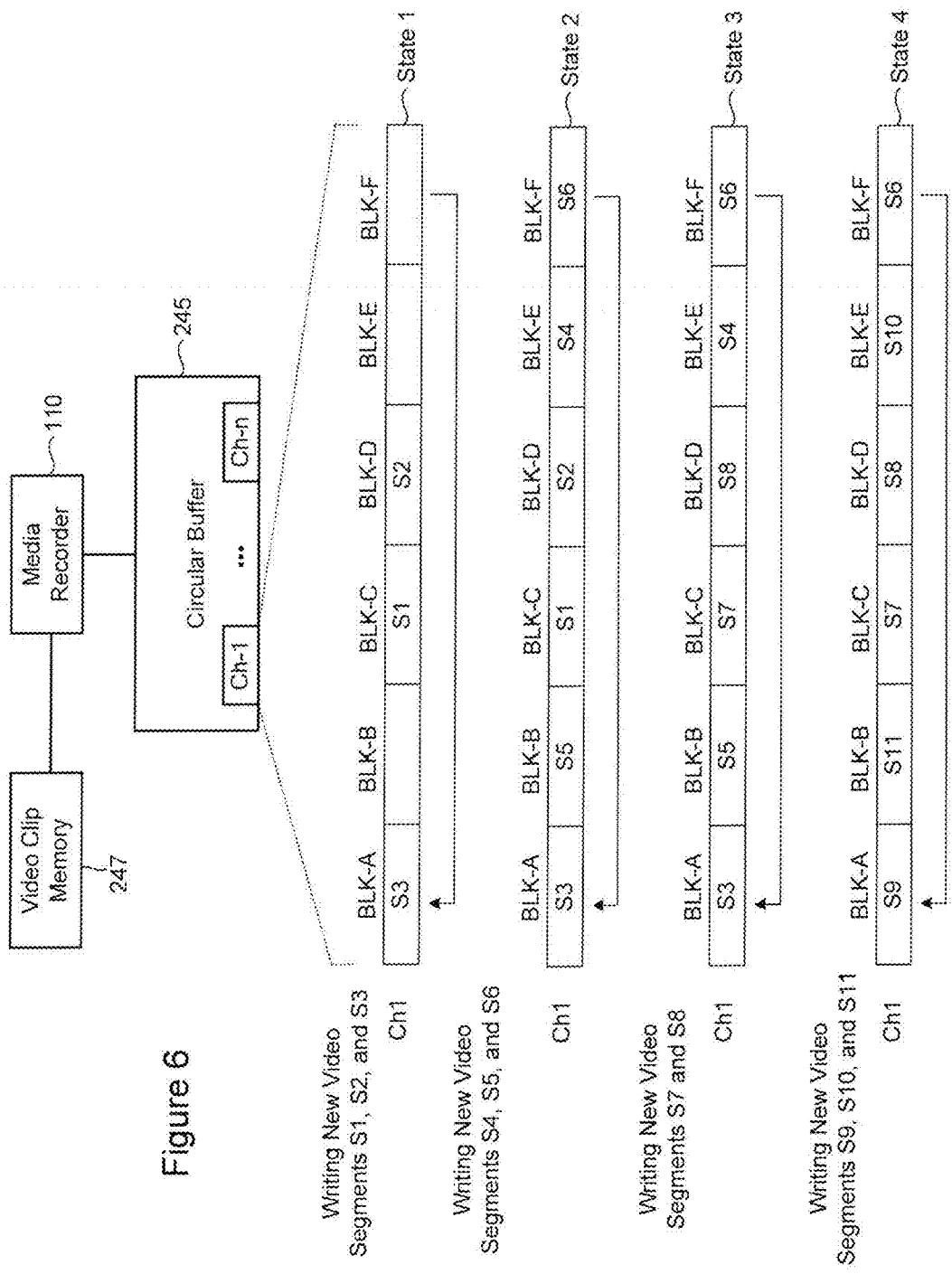
FIG. 6 illustrates details of managing video stored on an onboard media recorder using a loop memory or circular buffer management approach in accordance with various embodiments.

FIG. 5 illustrates a system for implementing on-demand video retrieval from a specified commercial vehicle in accordance with various embodiments. The system shown in FIG. 5 includes a media recorder 110 coupled to a transceiver 109 and one or more cameras 112. The media recorder 110, transceiver 109, and cameras 112 are configured for use on a commercial vehicle 150. The media recorder 110 is configured to receive video from one or more cameras 110 via a camera interface 248. The media recorder 110 includes a memory 241 configured to store various types of image/video information. In the embodiment shown in FIG. 5, the memory 241 includes a video clip memory 247 and a circular buffer memory 245. The video clip memory 245 is configured to store event-based video or video clips generated by the onboard system of the vehicle 150. The circular buffer memory 245 is configured to store one or more loops of video each having a predetermined duration. In some embodiments, the circular buffer memory 245 is configured to store two or more loops of video, with each loop corresponding to one channel of video associated with one of the cameras 112. For example, the circular buffer memory 245 can be configured to simultaneously record between 2 and 16 channels of video (e.g., 4, 8, 12 or 14 channels). According to some embodiments, the circular buffer memory 245 is configured to store one or more loops of video as a circular buffer having a predetermined duration in accordance with a FIFO (first-in-first-out) queuing methodology, an example of which is shown in FIG. 6. It is understood that any number of channels of video can be recorded by the circular buffer memory 245, and that the specific number of channels discussed above is for non-limiting illustrative purposes.

According to various embodiments, the central office 240 is configured to transmit a video request command 239 wirelessly to the vehicle 150, which is received by the transceiver 109. The video request command 239 is typically initiated by a remote user via a review portal or other interface to the central office 240. For example, the remote user can be a fleet safety manager who is attempting to exonerate a driver of liability in connection with an incident involving the vehicle 150. As was discussed previously, event-based video may not be captured for some incidences involving the vehicle, yet such incidences still expose the driver and/or the fleet to liability. Capturing continuous video in a circular buffer memory 245 provides the opportunity to store a significant amount of video date onboard a vehicle 150 which can be subsequently retrieved for analysis by the central office 240.

Continuous video is captured in the circular buffer memory 245 and retained for a predetermined duration. In some embodiments, for example, the predetermined duration can be between about 10 minutes and about four weeks. In other embodiments, the predetermined duration is about two weeks, while in further embodiments the predetermined duration is determined by the maximum storage capacity of the circular buffer memory 245. For example, the circular buffer memory 245 can be implemented using up to four SD memory cards, each with a capacity of 128 GB. In this illustrative example, the predetermined duration can be determined by the time required to fill up to a total of four SD memory cards. When the predetermined duration is reached, video stored in the circular buffer memory 245 is overwritten on a first-in-first-out to basis.

FIG. 6 illustrates a storage methodology for managing a circular buffer memory 245 in accordance with various embodiments. As was discussed previously with reference to FIG. 5, the media recorder 110 can include a video clip memory 247 and a circular buffer memory 245. In some embodiments, the video clip memory 247 and the circular buffer memory 245 are separate memories, while in other embodiments these two functional memories are implemented in partitions of a common memory arrangement (e.g., the same hard disk drive, the same flash drive, or the same SD card(s)). The circular buffer memory 245 can include a number of different channels each receiving video data from a different camera (shown as Ch-1 through Ch-n in FIG. 6). FIG. 6 shows for different states (States 1-4) of the memory 245 associated with video channel 1 (Ch-1) for illustrative purposes.

For purposes of explanation, the circular buffer memory 245 shown in FIG. 6 is illustrated as having a series of blocks, BLK-A through BLK-F, to which continuous video can be written and retrieved. The total amount of video data that can be stored in blocks A through F represents the maximum size of a loop of video that can be stored in the circular buffer memory 245 for channel 1. In some embodiments, the circular buffer memory 245 can be implemented using a hard disk drive, in which case the blocks shown in FIG. 6 can be logical blocks or physical blocks. In other embodiments, the circular buffer memory 245 can be implemented using solid-state memory, such as flash memory, in which case the blocks shown in FIG. 6 can be considered pages of flash memory.

For State 1 of the circular buffer memory 245 shown in FIG. 6, all of the blocks are initially empty. For State 1, new video segments S1, S2, and S3 are received from a camera at the vehicle (e.g., an exterior camera) coupled to channel 1 of the circular buffer memory 245. Video segments S1, S2, S3 are written to blocks C, D, and A, respectively. For State 2, newly received video segments S4, S5, and S6 are received, which are written to blocks E, D, and F, respectively. At State 2, all memory blocks for channel 1 of the circular buffer memory 245 are full. The scenario illustrated for State 2 represents storage of a complete loop of video whose predetermined duration is dependent on the total amount of circular buffer memory 245 represented by blocks A-F. It is noted that this predetermined duration can correspond to a predetermined time duration, such as 1 week or 2 weeks. At State 3, the loop defined by blocks A-F is full. Accordingly, newly received video segments S7 and S8 overwrite previously stored video segments in a first-in-first-out manner. In this case, newly received video segments S7 and S8 replace the earliest received segments S1 and S2 in blocks C and D, respectively. In a similar manner, newly received video segments S9, S10, and S11 for State 4 replace earliest received segments S3, S4, and S5 in blocks A, E, and B, respectively.

With reference once again to FIG. 5, the video request command 239 for a particular vehicle is shown to specify a vehicle (e.g., vehicle ID), a date, a time, and a duration. The vehicle parameter of the video request command 239 represents the specific vehicle from which video data is being requested. The date parameter of the video request command 239 represents the date at which video data was captured at the vehicle 150, typically associated with an incident of interest to be reviewed by a fleet safety manager or other interested party. The time parameter of the video request command 239 represents the time at which the video data was initially recorded in the circular buffer memory 245 of the media recorder 110. The duration parameter of the video request command 239 represents the amount of video requested in terms of total elapsed time. For example, and with reference to FIG. 2, a video request command 239 transmitted from the central office 240 to a specified vehicle 150 resulted in the production of the VLP 219 shown in FIG. 2. The vehicle of the video request command 239 corresponds to the Vehicle ID 303 shown in the declaration data 305 of the VLP 219. The date of the video request command 239 is reflected as the date 306 shown in the declaration data 305 of the VLP 219. The start time 308 of the VLP 219 corresponds to the time parameter of the video request command 239. The duration of the vehicle request command 239 is reflected in the declaration data 305 as the duration 312 (10 minutes) of the VLP 219.

In response to receiving the video request command 239 via the transceiver 109 of the specified vehicle 150, a controller 249 of the media recorder 110 initiates access to the circular buffer memory 245 and coordinates retrieval of a VLP 245' that corresponds to the date, time, and duration specified in the video request command 239. The VLP 245' is transferred from the circular buffer memory 245 by the controller 249 to the transceiver 109 for transmission to the central office 240. Preferably, the VLP 245' is transmitted from the specified vehicle 150 to the central office 240 immediately after receipt of the video request command 239. Immediate transmission of the VLP 245' to the central office 240 assumes that the communication infrastructure 121 allows for real-time connectivity between the central office 240 and the vehicle 150. In cases where a real-time connection cannot be established, the VLP 245' can be transmitted to the central office 240 at the next available opportunity (e.g., the next time the vehicle 150 comes into range of a cellular tower 121).

Figure 7:
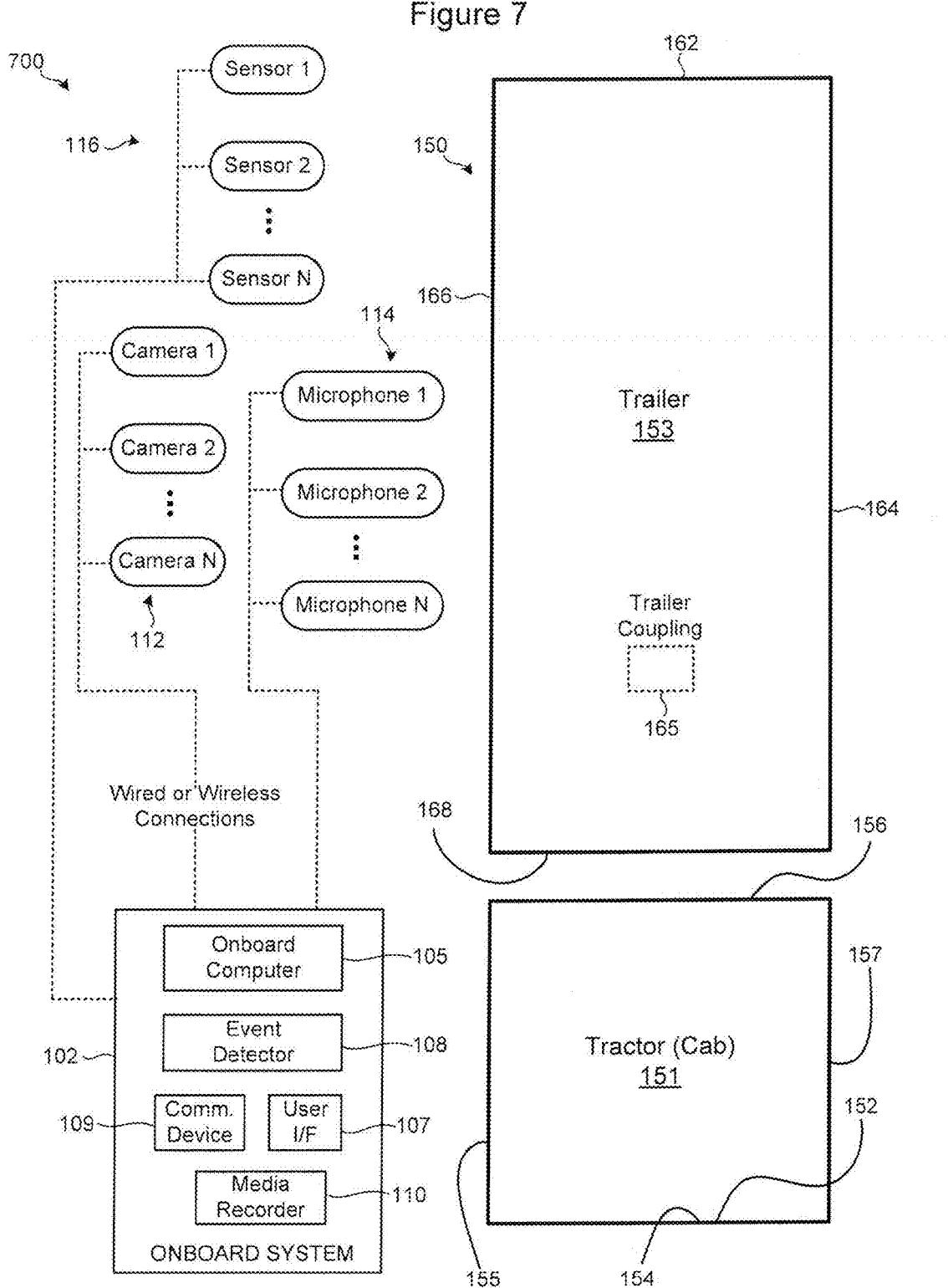
FIG. 7 is a block diagram of an apparatus for acquiring and processing video, audio, event, sensor, and other data for a commercial vehicle in accordance with various embodiments.

FIG. 7 is a block diagram of an apparatus 700 for acquiring and processing video, event, and other data for a commercial vehicle 150 in accordance with various embodiments. The apparatus 700 can be implemented to produce video, audio, event, and sensor data for use by the systems and methods described with reference to FIGS. 1-6.

The apparatus 700 includes a tractor 151 and a trailer 153 on which various electronic components are respectively mounted. The electronic components include an onboard system 102 which is preferably mounted in the tractor 151 of the vehicle 150. The onboard system 102 is shown to include an onboard computer 105 (which may alternatively be a mobile gateway as described in detail hereinbelow), an event detector 108, a user interface 107, a communication device 108, and a media recorder 110. The electronic components further include one or more cameras 112 (e.g., video and/or still photographic cameras), one or more microphones 114, and one or more sensors 116. The cameras 112, microphones 114, and sensors 116 are communicatively coupled to the onboard system 102 via wired or wireless connections. It is understood that a given vehicle 150 may be equipped with some, but not necessarily all, of the data acquisition devices shown in FIG. 7 (i.e., cameras 112, microphones 114 and sensors 116), and that other data acquisition devices can be mounted to the vehicle 150.

Various embodiments are directed to systems and methods that utilize one or more cameras 112 deployed within the tractor 151, and trailer 153, or both the tractor 151 and trailer 153 of the vehicle 150. In addition to the cameras 112, the tractor 151 and/or trailer 153 can be equipped to include one or more of the sensors 116 and microphones 114. Various embodiments disclosed herein can include cameras 112 situated within the interior or on the exterior of the trailer 153, on the exterior of the tractor 151, and/or within the cab of the tractor 151. For example, the various data acquisition devices illustrated in FIG. 7 can be mounted at different locations in, on, and/or around the trailer 153 and tractor 151 of the vehicle 150. All locations on the interior and exterior surfaces of the trailer 153 and tractor 151 are contemplated.

By way of example, the trailer 153 can include any number of cameras 112 positioned in or on the various surfaces of the trailer 153. A single or multiple (e.g., stereoscopic) cameras 112 can be positioned on a rear surface 162 of the trailer 153, allowing for driver viewing in a rearward direction of the vehicle 150. One or more cameras 112 can be positioned on a left and a right side surface 164 and 166 of the trailer 153, allowing for driver viewing in a rearward and/or lateral direction of the vehicle 150. One or more cameras 112 may be positioned on the front surface of the trailer 153, such as at a lower position to facilitate viewing of the hitch area and hose/conduit connections between the trailer 153 and the tractor 151. A camera 112 may also be situated at or near the trailer coupling location 165 or at or near other locations along the lower surface of the trailer 153, such as near fuel hoses and other sensitive components of the trailer 153.

In some embodiments, the tractor 151 includes a cab in which one or more cameras 112 and optionally microphones 114 and sensors 116 are mounted. For example, one camera 112 can be mounted on the dashboard 152 or rearview mirror 154 (or elsewhere) and directed outwardly in a forward-looking direction (e.g., forward-looking camera) to monitor the roadway ahead of the tractor 151. A second camera 112 can be mounted on the dashboard 152 or rearview mirror 154 (or elsewhere) and directed toward the driver and passenger within the cab of the tractor 151. In some implementations, the second camera 112 can be directed toward the driver (e.g., driver-looking camera), while a third camera 112 can be directed toward the passenger portion of the cab of the tractor 151.

The tractor 151 can include one or more exterior cameras 112, microphones 114, and/or sensors 116 according to various embodiments, such as an camera 112 mounted on a left side 157, a right side 155, and/or a rear side 156 of the tractor 151. The exterior cameras 112 can be mounted at the same or different heights relative to the top or bottom of the tractor 151. Moreover, more than one camera 112 can be mounted on the left side 157, right side 155 or rear side 156 of the tractor 151. For example, single or multiple (e.g., stereoscopic) left and right side cameras 112 can be mounted rearward of the left and/or right doors of the tractor 151 or, alternatively, the near or on the left and/or right side mirror assemblies of the tractor 151. A first rear camera 112 can be mounted high on the rear side 156 of the tractor 151, while a lower rear camera 112 can be mounted at or near the hitch area of the tractor 151.

Figure 8:
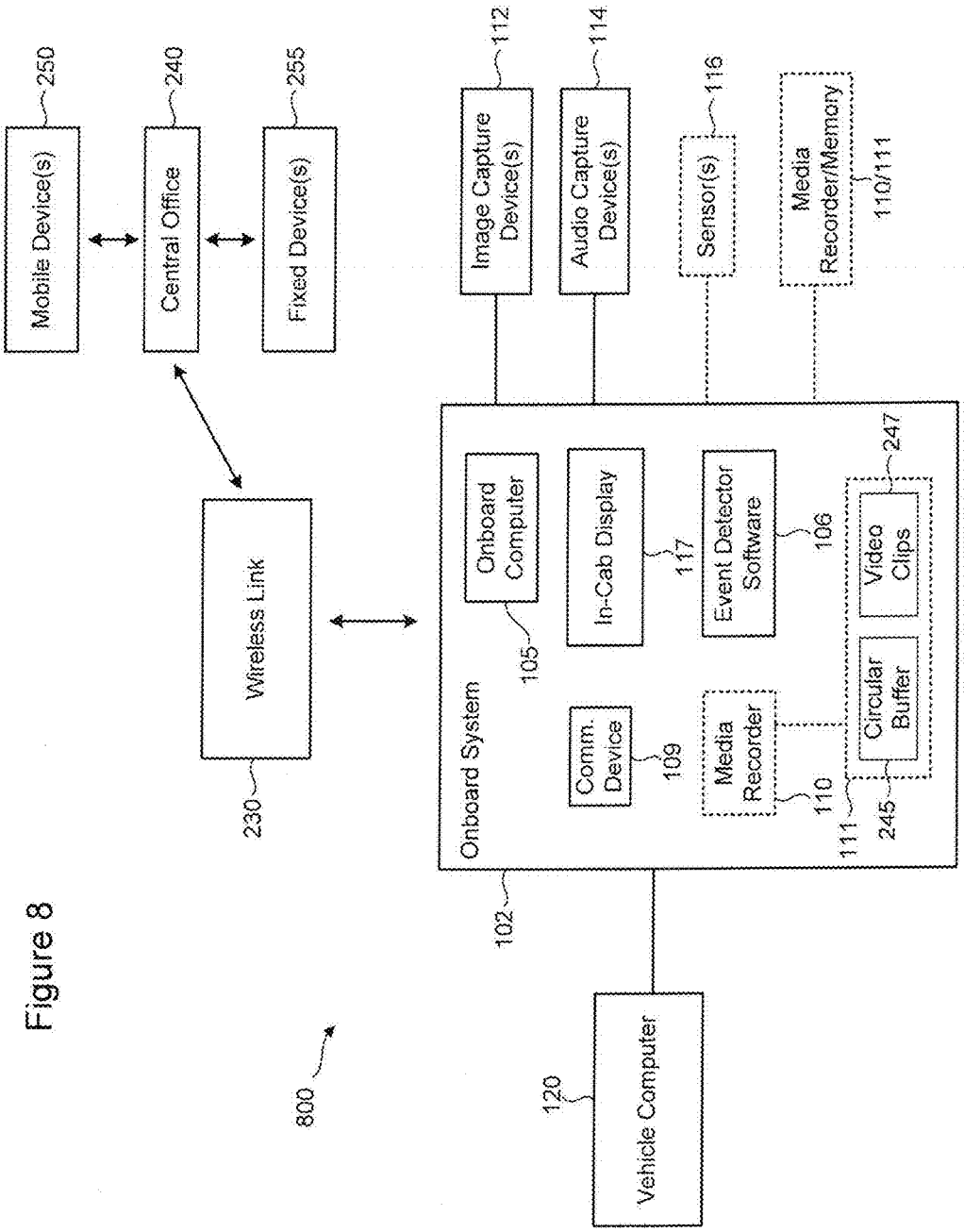
FIG. 8 is a block diagram of an apparatus for acquiring and processing video, audio, event, sensor, and other data for a commercial vehicle in accordance with various embodiments.

FIG. 8 is a block diagram of a system 800 for acquiring and processing video, audio, event, sensor, and other data in accordance with various embodiments. The apparatus 800 can be implemented to produce video, audio, event, and sensor data for use by the systems and methods described with reference to FIGS. 1-7. According to the representative embodiment shown in FIG. 8, the system 800 includes an onboard system 102 which is provided at the vehicle. Among various components, the onboard system 102 includes an onboard computer 105 (a microprocessor, controller, reduced instruction set computer (RISC), or other central processing module), an in-cab display 117 which can be mounted in the vehicle cab (e.g., fixedly or as a removable handheld device such as a tablet), and Event Detector software 106 stored in a memory of the onboard system 102. The display 117 can be part of a user interface which may include, for example, a keypad, function buttons, joystick, scrolling mechanism (e.g., mouse, trackball), touch pad/screen, or other user entry mechanisms, as well as a speaker, tactile feedback, etc. The memory of the onboard system 102, which may be integral or coupled to a processor of the onboard computer 105, can store firmware, executable software, and algorithms, and may further comprise or be coupled to a subscriber interface module (SIM), wireless interface module (WIM), smart card, or other fixed or removable memory device/media.

The onboard system 102 is communicatively coupled to a vehicle computer 210, which is typically the information hub of the vehicle, and also to a central office 240 (e.g., remote system) via one or more communication links, such as a wireless link 230 via a communication device 108. The communication device 108 can be configured to facilitate over-the-air programming (OTAP) and interrogation of the onboard system 102 by the central office 240 via the wireless link 230 and/or other links. Connectivity between the onboard system 102 and the central office 240 may involve a number of different communication links, including cellular, satellite, and land-based communication links. The central office 240 provides for connectivity between mobile devices 250 and/or fixed (e.g., desktop) devices 255 and one or more servers (e.g., fleet management system) of the central office 240. The central office 240 can be an aggregation of communication and data servers, real-time cache servers, historical servers, etc. In one embodiment, the central office 240 includes a computing system that represents at least the communication/data servers and associated computing power needed to collect, aggregate, process and/or present the data, including video and event data, associated with vehicle events. The computing system of the central office 240 may be a single system or a distributed system, and may include media drives, such as hard and solid-state drives, CD-ROM drives, DVD drives, and other media capable of reading and/or storing information.

In some embodiments, the onboard system 102 incorporates a media recorder 110, such as a digital media recorder (DMR), a digital video recorder (DVR) or other media storage device. In other embodiments, the onboard system 102 is communicatively coupled to a separate media recorder 110 via an appropriate communication interface. The media recorder 110 can include one or more memories of the same or different technology. For example, the media recorder 110 can include one or a combination of solid-state (e.g., flash), hard disk drive, optical, and hybrid memory (combination of solid-state and disk memories). Memory of the media recorder 110 can be non-volatile memory (e.g., flash, magnetic, optical, NRAM, MRAM, RRAM or ReRAM, FRAM, EEPROM) or a combination of non-volatile and volatile (e.g., DRAM or SRAM) memory. Because the media recorder 110 is designed for use in a vehicle, the memory of the media recorder 110 is limited. As such, various memory management techniques, such as that described previously and hereinbelow, can be employed to capture and preserve event-based data and video loop data (e.g., VLPs).

The media recorder 110 is configured to receive and store at least image data, and preferably other forms of media including video, still photographic, audio, and data from one or more sensors (e.g., 3-D image data), among other forms of information. Data produced by one or more cameras 112 (still or video cameras), one or more audio capture devices 114 (microphones or other acoustic transducers), and one or more sensors 116 (radar, infrared sensor, RF sensor or ultrasound sensor) can be communicated to the onboard system 102 and stored in the media recorder 110 and/or memory 111.

In addition to storing various forms of media data, the media recorder 110 can be configured to cooperate with the onboard computer 105 or a separate processor to process the various forms of data generated in response to a detected event (e.g., sudden deceleration, user-initiated capture command). The various forms of event-related data stored on the media reorder 110 (and/or memory 111) can include video, still photography, audio, sensor data, and various forms of vehicle data acquired from the vehicle computer 120. As was previously discussed, the media record memory or a separate memory 111 can be configured to include a circular buffer memory 245 and a video clip memory 247.

In some implementations, the onboard computer 105 or other processor cooperates with the media recorder 110 or other memory 111 to package disparate forms of event-related for transmission to the central office 240 via the wireless link 230. The disparate forms of data may be packaged using a variety of techniques, including techniques involving one or more of encoding, formatting, compressing, interleaving, and integrating the data in a common or separate file structures. As was previously discussed, in some embodiments, the media recorder 110 is equipped (or is coupled to) its own cellular link separate from that used by the onboard system 102 (e.g., separate from the communication device 109). Use of a separate cellular link by the media recorder 110 allows for tailoring the link by the service plan specifically for image/video communication between the vehicle and the central office 240.

Figure 9:
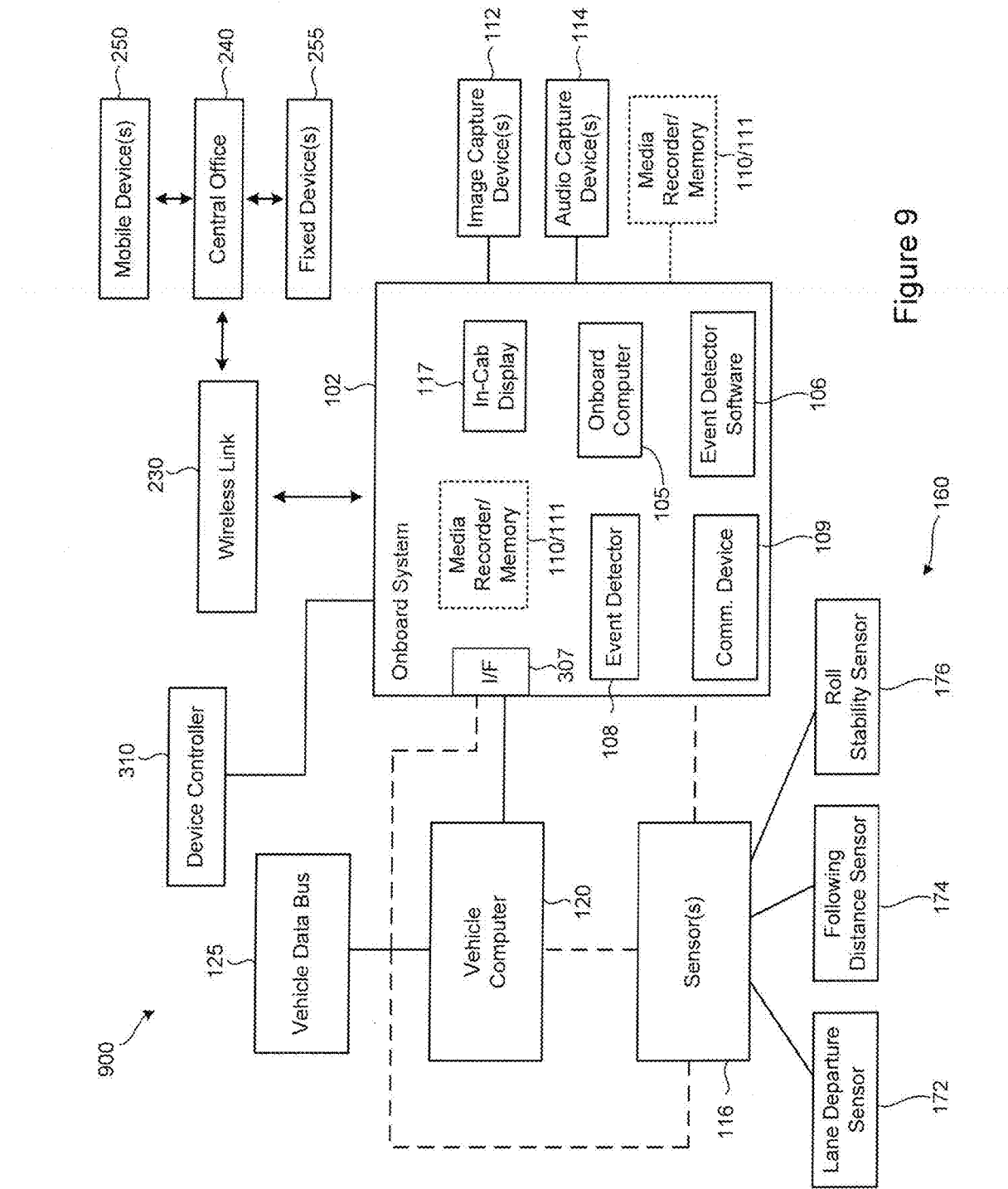
FIG. 9 is a block diagram of an apparatus for acquiring and processing video, audio, event, sensor, and other data for a commercial vehicle in accordance with various embodiments.

FIG. 9 is a block diagram of a system 900 for acquiring and processing video, event, sensor and other data in accordance with various embodiments. The apparatus 900 can be implemented to produce video, audio, event, and sensor data for use by the systems and methods described with reference to FIGS. 1-8. In the representative embodiment shown in FIG. 9, the system 900 includes an onboard system 102 communicatively coupled to a vehicle computer 120 via an interface 307 and to a central office 240 via a wireless link 230 (and possibly other links). The central office 240 is coupled to the onboard system 102 via a cellular link, satellite link and/or a land-based link, and can be communicatively coupled to various mobile entities 250 and fixed devices 255. The onboard system 102 includes an in-cab display 117, an onboard computer 105, Event Detector software 106, and a communications device 108. The onboard system 102 incorporates a media recorder 110 or, alternatively or in addition, is coupled to a separate media recorder 110 or memory system via an appropriate communication interface. In some embodiments, information acquired by the Event Detector software 106 is obtained from the vehicle computer 120 via the interface 307, while in other embodiments the onboard system 102 is coupled to the vehicle data bus 125 or to both the vehicle computer 120 and data bus 125, from which the needed information is acquired for the Event Detector software 106. In further embodiments, the Event Detector software 106 operates on data received from the central office 240, such as information stored in a transportation management system supported at or coupled to the central office 240.

According to the embodiment shown in FIG. 9, a variety of vehicle sensors 160 (e.g., $3^{rd}$ party sensors) are coupled to one or both of the onboard system 102 and/or the vehicle computer 120, such as via the vehicle data bus 125. A representative, non-exhaustive listing of useful vehicle sensors 160 include a lane departure sensor 172 (e.g., a lane departure warning and forward collision warning system), a following distance sensor 174 (e.g., a collision avoidance system), and a roll stability sensor 176 (e.g., an electronic stability control system). Representative lane departure warning and forward collision warning systems include Mobileye—5 Series, Takata—SAFETRAK, and Bendix—SAFETYDIRECT. Representative electronic stability control systems include Bendix—(ESP) Electronic Stability Program, and Meritor—(RSC) Roll Stability Control. Representative collision avoidance systems include Bendix—WINGMAN and Merito—ONGUARD. Each of these sensors 172, 174, 176 or sensor systems is respectively coupled to the vehicle computer 120 and/or the vehicle data bus 125. In some embodiments, one or more of the vehicle sensors 160 can be directly coupled to the onboard system 102.

A device controller 310 is shown coupled to the onboard system 102. According to some embodiments, the device controller 310 is configured to facilitate adjustment of one or more parameters of the cameras 112, the audio capture devices 114, and/or the sensors 116. In some embodiments, the device controller 310 facilitates user or automated adjustment of one or more parameters of the cameras 112, such as field of view, zoom, resolution, operating mode (e.g., normal vs. low-light modes), frame rate, and panning or device orientation, for example. The device controller 310 can receive signals generated at the vehicle (e.g., by a component or a driver of the vehicle), by the central office 240, or a client of the central office (e.g., mobile device 250 or fixed device 255).

According to some embodiments, a mobile gateway unit can be implemented at the onboard system 102, instead of or as a supplement to the onboard computer 105. A mobile gateway unit can be implemented for use by the systems and methods described with reference to FIGS. 1-9. A mobile gateway provides a wireless access point (e.g., Wi-Fi hotspot) and a server that provides sensor, video capture, and other data via a network server. This server runs locally on the vehicle, and may utilize a known data access protocol, such as Hypertext Transport Protocol (HTTP). In this way, a commodity user device such as smartphone or tablet can be used to access the vehicle data and other fleet management-type data. This can reduce costs and leverage the development and improvements in general-purpose consumer and/or commercial mobile devices. For example, features such as voice recognition, biometric authentication, multiple applications and protocol compatibility, are available "out-of-the-box" with modern mobile devices, and these features can be useful for in-cab applications.

The mobile gateway serves generally as a data collection and disbursement device, and may include special- or general-purpose computing hardware, such as a processor, a memory, and input/output (I/O) circuitry. In some embodiments, the event recorder of the onboard system can be wirelessly coupled to the mobile gateway, such as via WiFi® or Bluetooth®. The mobile gateway can also include a sensor interface that may be coupled to external data gathering components such as sensor controller, one or more cameras, add-on sensors, microphones, among others. The sensor interface may include data transfer interfaces such as serial port (e.g., RS-232, RS-422, etc.), Ethernet, Universal Serial Bus (USB), FireWire, etc.

The sensor controller coupled to the mobile gateway may be configured to read data from vehicle type busses, such as Controller Area Network (CAN). Generally, CAN is a message-based protocol that couples nodes to a common data bus. The nodes utilize bit-wise arbitration to determine which node has priority to transmit onto the bus. Various embodiments need not be limited to CAN busses; the sensor controller (or other sensor controllers) can be used to read data from other types sensor coupling standards, such as power-line communication, IP networking (e.g., Universal Plug and Play), I²C bus, Serial Peripheral Interface (SPI) bus, vehicle computer interface, etc. The sensor controller may be external to the mobile gateway, or it may be incorporated within the mobile gateway, e.g., integrated with main board and/or as an expansion board/module.

In addition to providing data sources, the mobile gateway can employ a publish/subscribe model, which also allows for flexible and extendable views of the data to vehicle occupants (e.g., such as via a user device). The mobile gateway can include a readily-available proximity radio that may use standards such as Wi-Fi® or Bluetooth®. The proximity radio may provide general-purpose Internet access to the user device, e.g., by routing data packets via the wireless network used to communicate with a cloud gateway. A server component can provide local content (e.g., content produced within the mobile gateway) to the user device over the proximity radio via well-known protocols, such as HTTP, HTTPS, Real-Time Streaming Protocol (RTSP), File Transfer Protocol (FTP), Simple Mail Transfer Protocol (SMTP), etc. A commercially available application such as a browser or media player running on the user device can utilize the services of the server component without any customization of the user device. Embodiments of the present disclosure can be implemented to include a mobile gateway facility and functionality as disclosed in the following commonly owned U.S. Provisional Patent Applications: U.S. Provisional Patent Application Ser. No. 62/038,611 filed Aug. 18, 2014; U.S. Provisional Patent Application Ser. No. 62/038,592 filed Aug. 18, 2014; and U.S. Provisional Patent Application Ser. No. 62/038,615 filed Aug. 18, 2014, each of which is incorporated herein by reference in its respective entirety.

Systems, devices, or methods disclosed herein may include one or more of the features, structures, methods, or combinations thereof described herein. For example, a device or method may be implemented to include one or more of the features and/or processes described herein. It is intended that such device or method need not include all of the features and/or processes described herein, but may be implemented to include selected features and/or processes that provide useful structures and/or functionality. The systems described herein may be implemented in any combination of hardware, software, and firmware. Communication between various components of the systems can be accomplished over wireless or wired communication channels. Moreover, it is understood that embodiments of the disclosure can be implemented for private vehicles and are not limited only to commercial vehicles.

Hardware, firmware, software or a combination thereof may be used to perform the functions and operations described herein. Using the foregoing specification, some embodiments of the disclosure may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device. From the description provided herein, those skilled in the art are readily able to combine software created as described with appropriate general purpose or special purpose computer hardware to create a computing system and/or computing subcomponents embodying various implementations of the disclosure, and to create a computing system(s) and/or computing subcomponents for carrying out the method embodiments of the disclosure.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method, comprising:
   capturing video from a plurality of cameras provided at a commercial vehicle;

storing, simultaneously in a circular buffer memory of a media recorder at the vehicle, a plurality of loops of the video each corresponding to one channel of video associated with one of the plurality of cameras, each of the plurality of loops of video having a predetermined duration that is limited by a storage capacity of the circular buffer memory;

detecting, using an event detector at the vehicle, predetermined vehicle events occurring during vehicle operation and generating event data;

storing, in a video clip memory of the media recorder, a video clip of a predetermined duration and transmitting the video clip and the event data to a remote location in response to detection of a predetermined vehicle event;

receiving, at the vehicle, a video request command generated at the remote location specifically for the vehicle, the video request command specifying at least a calendar date and a time; and transmitting, from the vehicle, a portion of the loops of video to the remote location in response to the video request command if the portion of the loops of video associated with the calendar date and time of the video request command is available in the circular buffer memory, the portion of the loops of video comprising a vehicle ID that uniquely identifies the particular vehicle and a driver ID that uniquely identifies a driver of the particular vehicle.

2. The method of claim 1, wherein:
transmitting comprises transmitting the portion of the loops of video that includes video recorded on the calendar date and at the time specified in the video request command.

3. The method of claim 1, wherein:
the video request command specifies a duration and a calendar date and time; and
transmitting comprises transmitting the portion of the loops of video equal in length to the duration and that includes video recorded on the calendar date and at the time specified in the video request command.

4. The method of claim 1, wherein the predetermined duration of the loops of video is between about 10 minutes and about 4 weeks.

5. The method of claim 1, wherein the predetermined duration of the loops of video is between about 1 week and about 2 weeks.

6. The method of claim 1, wherein the predetermined duration of the loops of video is equal to a recording capacity of the circular buffer memory.

7. The method of claim 1, wherein the video comprises video captured by one or more cameras external to the vehicle.

8. The method of claim 1, wherein the video comprises video captured by one or more cameras internal to the vehicle.

9. The method of claim 1, wherein the video comprises video captured by one or more cameras external and internal to the vehicle.

10. The method of claim 1, wherein:
the video comprises video captured by a plurality of cameras external or internal to the vehicle; and
the video request command specifies one or more of the plurality of cameras of the vehicle; and
transmitting comprises transmitting, from the vehicle, a portion of the loop of video captured by the specified one or more cameras of the plurality of cameras to the remote location in response to the video request command.

11. The method of claim 1, wherein the video request command is generated at a time subsequent to occurrence of the predetermined vehicle-event.

12. An apparatus for use with a commercial vehicle, comprising:
a plurality of cameras provided at the vehicle;
a media recorder configured to receive video from the plurality of cameras, the media recorder comprising a video clip memory and a circular buffer memory, the video clip memory configured to store event-based video clips, and the circular buffer memory configured to simultaneously store a plurality of loops of video each corresponding to one channel of video associated with one of the plurality of cameras, each of the plurality of loops of video having a predetermined duration that is limited by a storage capacity of the circular buffer memory;
a transceiver communicatively coupled to the media recorder, the transceiver configured to receive a video request command generated at a central office specifically for the vehicle, the video request command specifying at least a calendar date and a time; and
an event detector configured to communicate with a vehicle computer, detect predetermined vehicle events occurring during vehicle operation, and generate event data;
wherein the media recorder is configured to store a video clip of a predetermined duration in the video clip memory and the transceiver is configured to transmit the video clip and the event data to the central office in response to detection of a predetermined vehicle event by the event detector;
wherein the media recorder is configured to retrieve a portion of the loops of video stored in the circular buffer memory and the transceiver is configured to transmit the portion of the loops of video to the central office in response to the video request command if the portion of the loops of video associated with the calendar date and time of the video request command is available in the circular buffer memory, the portion of the loops of video comprising a vehicle ID that uniquely identifies the vehicle and a driver ID that uniquely identifies a driver of the vehicle; and
wherein the plurality of cameras, the media recorder, the transceiver, and the event detector are configured to be mounted at the vehicle.

13. The apparatus of claim 12, wherein:
the transceiver comprises a first transceiver and a second transceiver;
the first transceiver is coupled to the media recorder and configured to transmit to the central office the event-based video clips and the loops of video respectively stored in the video clip memory and the circular buffer memory; and
the second transceiver is coupled to the event detector and configured to transmit the event data to the central office.

14. The apparatus of claim 12, wherein:
the media recorder is configured to retrieve from the circular buffer memory the portion of the loops of video that includes video recorded on the date and at the time specified in the video request command for transmission to the central office.

15. The apparatus of claim 12, wherein:
the video request command specifies a duration, the calendar date, and the time of day; and the media recorder is configured to retrieve from the circular buffer memory the portion of the loops of video equal in length to the duration and that includes video recorded on the date and at the time specified in the video request command.

16. The apparatus of claim 12, wherein the predetermined duration of the loops of video is between about 10 minutes and about 4 weeks.

17. The apparatus of claim 12, wherein the predetermined duration of the loops of video is equal to a recording capacity of the circular buffer memory.

18. The apparatus of claim 12, wherein the video comprises video captured by one or more cameras external or internal to the vehicle.

19. The apparatus of claim 12, wherein the video comprises video captured by one or more cameras external and internal to the vehicle.

20. The apparatus of claim 12, wherein:
the video comprises video captured by one or more cameras external or internal to the vehicles; and
the video request command specifies one or more of the cameras of the particular vehicle; and
the media recorder, in response to the video request command, is configured to retrieve from the circular buffer memory the portion of the loop of video captured by the specified one or more cameras for transmission to the central office.

21. The apparatus of claim 12, wherein:
the media recorder comprises a real-time clock that is updated from a first source via the transceiver; and
the event detector comprises a real-time clock that is updated from a second source different from the first source.

* * * * *